United States Patent
Goethals et al.

(10) Patent No.: US 12,359,077 B2
(45) Date of Patent: Jul. 15, 2025

(54) AQUEOUS POLYMER PARTICLE DISPERSION

(71) Applicant: AGFA NV, Mortsel (BE)

(72) Inventors: Fabienne Goethals, Mortsel (BE); Freya Curinckx, Mortsel (BE)

(73) Assignee: Agfa NV, Mortsel (BE)

( * ) Notice: Subject to any disclaimer, the term of this patent is extended or adjusted under 35 U.S.C. 154(b) by 288 days.

(21) Appl. No.: 18/011,588

(22) PCT Filed: Jun. 18, 2021

(86) PCT No.: PCT/EP2021/066624
§ 371 (c)(1),
(2) Date: Dec. 20, 2022

(87) PCT Pub. No.: WO2021/259795
PCT Pub. Date: Dec. 30, 2021

(65) Prior Publication Data
US 2023/0159773 A1    May 25, 2023

(30) Foreign Application Priority Data
Jun. 23, 2020    (EP) .................................... 20181551

(51) Int. Cl.
| | | |
|---|---|---|
| *C09D 11/322* | (2014.01) | |
| *B01J 13/16* | (2006.01) | |
| *B41J 11/00* | (2006.01) | |
| *B41M 5/00* | (2006.01) | |
| *C08G 18/10* | (2006.01) | |
| *C08G 18/32* | (2006.01) | |
| *C08G 18/34* | (2006.01) | |
| *C08G 18/38* | (2006.01) | |
| *C08G 18/77* | (2006.01) | |
| *C08G 18/78* | (2006.01) | |
| *C08G 18/79* | (2006.01) | |
| *C08G 18/80* | (2006.01) | |
| *C09D 11/033* | (2014.01) | |
| *C09D 11/037* | (2014.01) | |
| *C09D 11/102* | (2014.01) | |
| *C09D 11/54* | (2014.01) | |
| *C09D 175/02* | (2006.01) | |
| *B41M 7/00* | (2006.01) | |
| *C08L 75/00* | (2006.01) | |

(52) U.S. Cl.
CPC ............. *C09D 11/102* (2013.01); *B01J 13/16* (2013.01); *B41J 11/00214* (2021.01); *B41M 5/0017* (2013.01); *C08G 18/10* (2013.01); *C08G 18/3228* (2013.01); *C08G 18/34* (2013.01); *C08G 18/3893* (2013.01); *C08G 18/778* (2013.01); *C08G 18/7831* (2013.01); *C08G 18/794* (2013.01); *C08G 18/8064* (2013.01); *C09D 11/033* (2013.01); *C09D 11/037* (2013.01); *C09D 11/322* (2013.01); *C09D 11/54* (2013.01); *C09D 175/02* (2013.01); *B41M 5/0047* (2013.01); *B41M 5/0064* (2013.01); *B41M 7/009* (2013.01); *C08L 75/00* (2013.01)

(58) Field of Classification Search
CPC ... C09D 11/102; C09D 11/033; C09D 11/037; C09D 11/322; C09D 11/54; C09D 175/02; B01J 13/16; B41J 11/00214; B41M 5/0017; B41M 5/0047; B41M 5/0064; B41M 7/009; C08G 18/10; C08G 18/3228; C08G 18/34; C08G 18/3893; C08G 18/778; C08G 18/7831; C08G 18/794; C08G 18/8064; C08L 75/00
See application file for complete search history.

(56) References Cited

U.S. PATENT DOCUMENTS

2007/0211126 A1* 9/2007 Bauer .................. C09D 11/40
347/100

FOREIGN PATENT DOCUMENTS

| EP | 2441807 A1 * | 4/2012 | ........... C09D 11/102 |
|---|---|---|---|
| EP | 2620290 B1 | 5/2016 | |
| EP | 3085746 A1 | 10/2016 | |
| JP | 2004-174834 A | 6/2004 | |
| JP | 2010-121060 A | 6/2010 | |
| WO | WO 2016/122569 A1 | 8/2016 | |
| WO | WO 2016/165956 A1 | 10/2016 | |
| WO | WO 2018/077624 A1 | 5/2018 | |
| WO | WO 2019/187835 A1 | 10/2019 | |
| WO | WO 2019/243080 A1 | 12/2019 | |
| WO | WO 2020/076744 A1 | 4/2020 | |

OTHER PUBLICATIONS

U.S. Appl. No. 18/011,594, filed Dec. 20, 2022.
European Patent Office, International Search Report in International Patent Application No. PCT/EP2021/066624, mailed Nov. 12, 2021, 4 pp.
European Patent Office, Written Opinion in International Patent Application No. PCT/EP2021/066624, mailed Nov. 12, 2021, 6 pp.

* cited by examiner

*Primary Examiner* — Yaovi M Ameh
(74) *Attorney, Agent, or Firm* — Leydig, Voit & Mayer, Ltd.

(57) ABSTRACT

An aqueous polymeric particle dispersion, the particle comprises a polymer and a Si—O-containing moiety, the Si—O-containing moiety is linked to the polymer. The polymeric particle dispersion can be incorporated in aqueous printing liquids such as aqueous inkjet inks.

15 Claims, No Drawings

AQUEOUS POLYMER PARTICLE DISPERSION

CROSS-REFERENCE TO RELATED APPLICATIONS

This patent application is the U.S. national phase of copending International Patent Application No. PCT/EP2021/066624, filed Jun. 18, 2021, which claims the benefit of European Patent Application No. 20181551.1, filed Jun. 23, 2020.

TECHNICAL FIELD

The present invention relates to aqueous dispersions of polymer particles for use in printing and more specifically in inkjet printing with aqueous inkjet inks on low-absorbing or non-absorbing substrates.

BACKGROUND ART

The industrial applications of ink jet are expanding into more and more fields of technology, having to meet ever more demanding physical properties. Industrial printing technology has to be compatible with cheap substrates, which are often poly(olefin) based. It is known in the industry that adhesion to poly(olefins) is often very difficult.

Until now, ink jet technology on non-absorbing substrates, including poly(olefins) has been UV based. UV-based inks contain toxic and/or harmful ingredients such as photo-initiators, monomers and the printing process requires a curing station which increases the price and complexity of the printing equipment. Therefore, aqueous ink technology is gradually gaining ground also on non-absorbing substrates. Adhesion of aqueous resin based inks directly on poly(olefins) remains even more difficult compared to UV technology.

Several approaches are known in the art to improve adhesion of aqueous inks, including corona treatment, flame treatment of the substrate and priming of the substrate with primers containing resins such as polyurethane resins. Pre-treating the substrate with corona and flame treatment complicates the work flow and does not always solve the adhesion problem, especially on poly(olefins).

Aqueous based primers or aqueous based inkjet inks containing resins such as polyurethane resins have been designed to improve image durability such as scratch resistance, abrasion resistance and chemical resistance. WO2018077624A describes aqueous inkjet inks comprising a polyurethane resin having dispersing groups providing electronic and steric colloidal stabilisation. WO 2016/122569 teaches a primer solution comprising a polyurethane resin having a specific glycol. Aqueous inks and primers still suffer from insufficient adhesion to poly(olefin) substrates. Moreover, the use of resins dispersed or dissolved in an aqueous ink or primer which has to be jetted via e.g. an inkjet head, causes problems of jetting reliability. This may be due to film formation of the resin at the nozzle plate causing clogging of the nozzles when the inkjet head is not in use for some time.

Another approach to improve adhesion and non-porous substrates and improve water-fastness of inkjet printed images has been realized by the use of silane coupling agents such as alkoxysilanes to obtain a polycondensation reaction, see JP2004174834. Alkoxysilanes are very prone to hydrolysis in an aqueous vehicle and the reaction temperature during the polycondensation reaction has to be very well controlled (polycondensation reaction temperature). If the polycondensation reaction temperature is lower than room temperature, the polycondensation reaction may occur in the ink before use, and the liquid stability of the ink and the discharge stability are hindered. JP 2010121060 solves the problem of uncontrolled polycondensation of alkoxysilanes by using a separate reaction liquid containing a compound having an alkoxysilyl group, and wherein the pH of the liquid containing the liquid is lower than the pH of the ink. However, the requirement of an extra reaction liquid represents a major complexation of the inkjet printer design.

In WO2016/165956A, aqueous resin based inkjet inks are described wherein the resin is present as a capsule. To achieve good binding properties and hence durable images, reactive chemistry such as blocked isocyanates is incorporated in the core of the capsule. The presence of such reactants may give health and safety issues when not completely reacted. Furthermore, reactive chemistry such as blocked isocyanates requires a temperature of more than 120° C., preferably more than 150° C. to become reactive. These high temperatures are not compatible with non-absorbing substrates such as poly(olefins) as they may lead to deformation or melting.

WO19243080A discloses core shell particles for inkjet inks, wherein a silanol group is linked to the polymeric shell and the core contains reactants which are capable to form a reaction product upon the application of irradiation or heat, such as blocked isocyanates. The silanol group is incorporated by means of aminoalkoxysilanes added to the aqueous phase in the interfacial polymerisation of the particle. An improvement in storage stability of the inks containing the core shell particles is observed, but is still insufficient for practical use.

EP3085746A discloses acrylic resin particles for aqueous inkjet inks. The acrylic resin particles are obtained by copolymerizing a silane coupling agent having an ethylenically unsaturated group.

In both WO19243080A and EP3085746A, the silane precursor comes into contact with water during the preparation of the particle. It is believed that hydrolyses of the alkoxysilane is prone to occur.

Therefore, there is still a need for a resin technology that intrinsically shows a good adhesion performance to non-absorbing substrates such as PMMA, PVC and poly(olefins), at the same time can be incorporated in aqueous inkjet inks or jettable primers, providing reliable jetting performances and which bring the storage stability of aqueous inkjet inks to a practically acceptable level.

SUMMARY OF INVENTION

It is the objective of the present invention to provide a solution to the above stated problem. The objective has been achieved by providing an aqueous dispersion of particles as defined in claim 1.

It is further an object of the present invention to provide an inkjet ink comprising the particle dispersion of claim 1 as defined in claim 9.

It is another embodiment of the invention to provide a printing method using inkjet inks comprising the resin particle dispersion of claim 1 as defined in claim 14.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Aqueous Dispersion of Particles

The invention comprises a particle dispersed in an aqueous medium, the particle comprises a polymer and a Si—O-containing moiety. The Si—O-containing moiety is according to structural Formula I and is linked to the polymer via the linking group L.

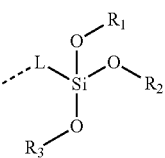

structural Formula I wherein
$R_1$, $R_2$, $R_3$ represent independently H, optionally substituted alkyl, aryl, aralkyl or heteroalkyl groups
L represents a divalent or multivalent linking group comprising no more than eight carbon atoms.

In a more preferred embodiment, the Si—O-containing moiety linked to the polymer is according to structural Formula II.

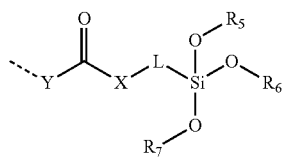

structural Formula II wherein
$R_5$, $R_6$, $R_7$ represent independently substituted or unsubstituted alkyl, aryl, aralkyl or heteroalkyl groups
L represents a divalent or multivalent linking group comprising no more than eight carbon atoms;
X is NH, NR, or O;
Y is NH, NR, O, or a carbonyl moiety
R is a substituted or unsubstituted alkyl, aryl, aralkyl or heteroalkyl group.

Without being bound by any theory, it is thought that the presence of the polymer prevents or substantially slows down the hydrolysis of the Si—O—R groups in the Si—O-containing moiety. Hence, due to this prevented hydrolysis, the reactivity of the Si—O—R groups is maintained for the crosslinking reaction in the ink. The reactive Si—O—R groups will then be triggered for reaction by an increase of temperature, for example during the drying of the jetted ink. The temperature increase will allow alcoholysis or hydrolysis of the Si—O—R groups, and a crosslinked network is obtained, by the known sol-gel reaction. This crosslinked network assures the good adhesion and the water and solvent resistance of the jetted of the colorants of the ink In a preferred embodiment, the particles according to the invention are microcapsules with a core-shell structure, the shell preferably being the polymer. The Si—O-containing moiety can be present in both core and shell.

The polymer is preferably hydrophobic, and is more preferably crosslinked. Most preferably, the polymer is a polyureum, polyurethane, polyureum-urethane, polyester, polycarbonate, polyamide, melamine based polymer and mixtures thereof.

A.1. Si—O-Containing Moiety

The Si—O-containing moiety originates preferably from an alkoxysilane. Alkoxysilanes are substituted silanes, in which the substituents are both alkyl and alkoxy groups. The alkyl groups can be varied and offer additional possibility to add functionality, which can improve compatibility with the polymer of the particle of the invention.

In a preferred embodiment of the invention, the alkoxysilane acts as a precursor to link a Si—O-containing moiety according to structural formula I to the polymer. Therefore, the alkoxysilane can have an additional reactive group. The reactive group is preferably an isocyanate group. This group can allow the reaction of the alkoxysilane with the polymer, especially when the polymer is formed during interfacial polymerisation. The linking of the alkoxysilane with the polymer can enhance the colloidal stability of the particle dispersion in water, as the alkoxysilane is then covalently linked to the polymer.

The Si—O-containing precursor is preferably a monofunctional alkoxysilane or a multi-functional silane. Multifunctional alkoxysilanes can be prepared by reacting multifunctional isocyanates with amino-containing alkoxysilanes. A multifunctional alkoxysilane can also be formed by reacting a multifunctional amine with an isocyanate-containing alkoxysilane. Especially preferred are alkoxysilane compounds in which a hydrogen bonding group is present, such as a urea, a urethane, an amide, an ester, an oxalate, an oxalylamide, etc. This is especially advantageous for the invention, as it is believed that the urea bond gives an additional stability of the particle dispersion, thanks to hydrogen bonding.

It is important that the particle dispersion is obtained by adding the Si—O— containing precursor in the organic solvent during the preparation of the particle dispersion (see § A.3). This has the benefit of an increased storage stability of the aqueous inks containing the particle dispersion. A possible reason for a less stable dispersion if the Si—O containing precursor is added to the aqueous solution during the preparation, could be an at least partial premature hydrolysis of the alkoxysilane groups of the Si—O containing precursor in the water-phase. This would prevent migration to the interphase of the capsule, and lead thus to inefficient modification of the polymeric shell.

In a more preferred embodiment of the invention, the Si—O-containing precursor can be generated in situ in the organic solvent by e.g. the reaction between multifunctional isocyanates and the amino-containing alkoxysilanes. The solution of the Si—O-containing precursor in the organic solvent can be used in the preparation of the particle dispersion (see § A.3.).

Typical, precursors for a Si—O-containing moiety according to structural formula I, and which can form a link with the polymer from the particle dispersion according to the invention are given in Table 1 without being limited thereto.

TABLE 1
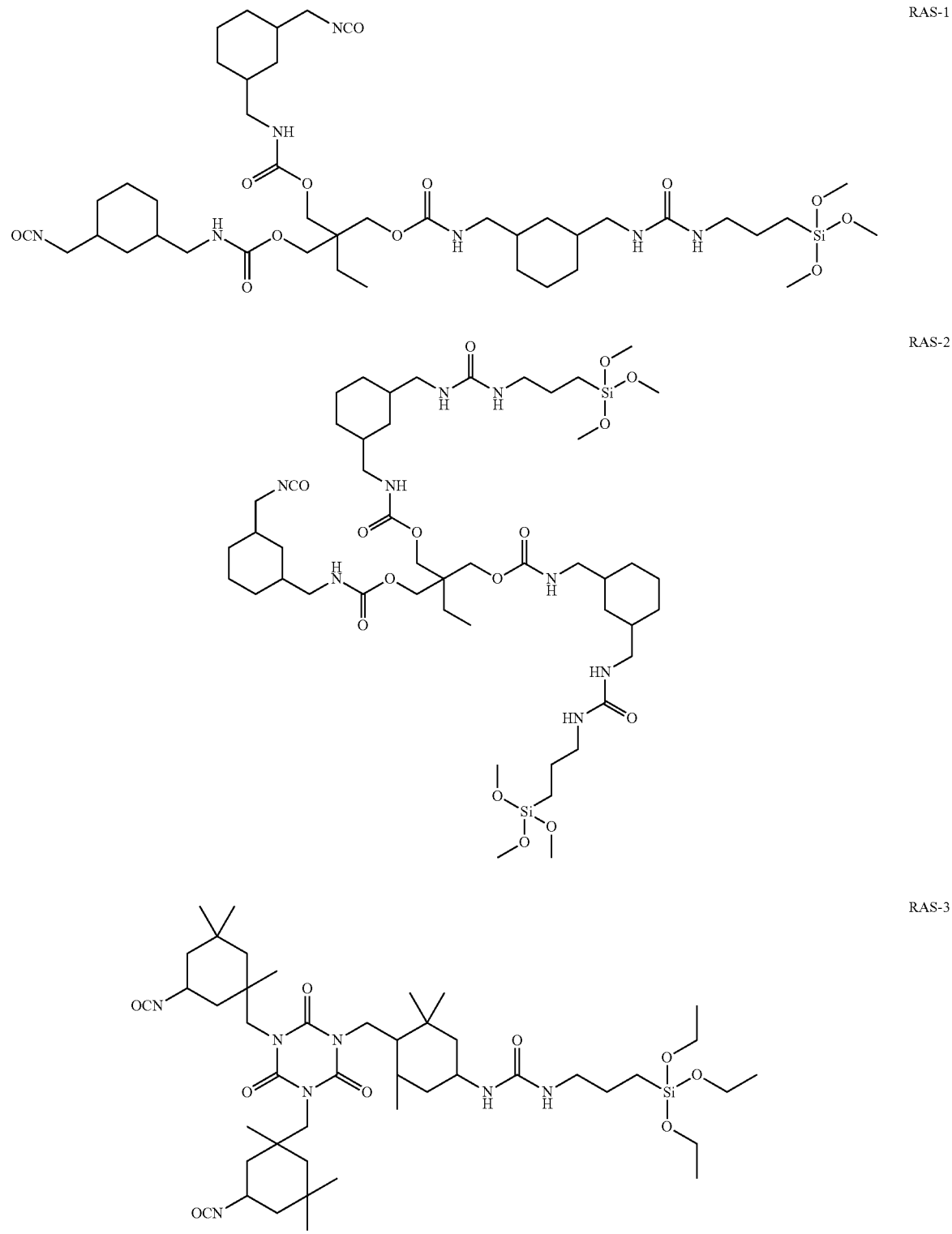

TABLE 1-continued

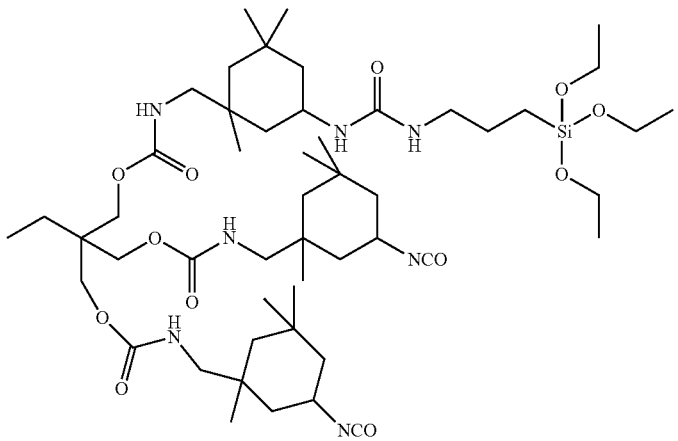

RAS-4

A.2. Polymer

The polymer making part of the particles dispersion according to the invention can be any non-water soluble polymer, but is preferably a polymer selected from the group of polyvinyls, polyureas, polyurethanes, polyurea-urethanes, polyesters, polycarbonates, polyamides, melamine based polymers and mixtures thereof. More preferably, if the particle is a capsule, the polymer forming the shell and surrounding the core is a polyurea, a polyurethane or a polyurea-urethane.

A.3. Preparation of the Particle Dispersion

The particle dispersion according to the invention can be prepared via different methods such as interfacial polymerization, mini-emulsion polymerization, dispersion of pre-formed polymers followed by solvent evaporation, solvent displacement, nanoprecipitation or salting out.

Suitable examples of the polymer in the polymer nanoparticles include a vinyl polymer and a condensed polymer (e.g., an epoxy resin, polyester, polyurethane, polyamide, cellulose, polyether, polyurea, polyimide, and polycarbonate). Among the above, a vinyl polymer is preferable because of easily controlled synthesis. However, for good physical properties, such as adhesion and solvent resistance, of the printed image, a polyurethane polymer or copolymer is also preferred.

The polymer nanoparticles are preferably self-dispersible polymer nanoparticles. In preparing a self-dispersing polymer nanoparticle, preferably a monomer is used selected from the group consisting of a carboxylic acid monomer, a sulfonic acid monomer, and a phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate. Such monomers may be incorporated into polyurethane copolymers which include a (meth)acrylate polymeric chain.

For polyurethane polymer particles, the self-dispersing group may be incorporated via a diol and/or a diamine having any of phosphate group, sulfonic acid group, N,N-disubstituted amino group, carboxyl group, neutralized phosphate group, neutralized sulfonic acid group, neutralized N,N-disubstituted amino group and neutralized carboxyl group. Specific examples thereof include trimethylolpropane monophosphate, trimethylolpropane monosulfate, a polyester diol where at least a part of dibasic acid component is sodium sulfosuccinate or sodium sulfoisophthalate, N-methyldiethanolamine, diaminocarboxylic acid such as lysine, cystine or 3,5-diaminocarboxylic acid, 2,6-dihydroxybenzoic acid, 3,5-dihydroxybenzoic acid, dihydroxyalkylalkanoic acid such as 2,2-bis(hydroxymethyl)propionic acid, 2,2-bis(hydroxyethyl)propionic acid, 2,2-bis(hydroxypropyl)-propionic acid, bis(hydroxymethyl)acetic acid or 2,2-bis(hydroxymethyl)butanoic acid, bis(4-hydroxyphenyl)-acetic acid, 2,2-bis(4-hydroxyphenyl)pentanoic acid, tartaric acid, N,N-hydroxyethylglycine, N,N-bis(2-hydroxyethyl)-3-carboxypropionamide and a carboxyl group-containing polycaprolactone diol where a lactone compound such as ε-caprolactone is added to dihydroxyalkylalkanoic acid.

For obtaining dispersed particles comprising a polymer and a Si—O— containing moiety according to structural formula I linked to that polymer, a Si—O-moiety containing precursor is first dissolved in a water-immiscible organic solvent having a boiling point of lower than 100° C. This solvent mixture is then finely dispersed in water or an aqueous medium, for example by means of a homogenizer, a microfluidizer or very high speed stirring in order to form an "oil-in-water" emulsion. The organic solvent is stripped of via distillation so that the particle dispersion is free of organic solvent.

Esters, like ethyl acetate, are particularly preferred as water immiscible solvent.

Further examples of an organic solvent having boiling point of lower than 100° C. include acetone, methyl ethyl ketone, tetrahydrofuran, ethyl ether, n-propyl ether, isopropyl ether, n-butyl methyl ether, tert-butyl methyl ether, n-butyl ethyl ether, tert-butyl ethyl ether, ethyl acetate, isopropyl acetate, methyl propionate and acetonitrile although they are non-limitative. In addition, each of them may be used solely or they may be used jointly by mixing them. Among those ones, ethyl acetate and methyl ethyl ketone are preferred as the organic solvent used for charging the compound containing the Si—O-containing moiety to the surface of the polymer nanoparticles.

A.3.2. Encapsulation

The precursor for a Si—O-containing moiety according to structural formula I, can be encapsulated by an encapsulation process in which the precursor is surrounded by a polymeric shell to give small capsules. During the encapsulation of a precursor for a Si—O-containing moiety according to structural formula I, the Si—O-containing moiety is linked to the polymer, the polymer forming the shell surrounding a core.

In the present invention preferably a polymerization method is used, as it allows the highest control in designing the capsules. More preferably interfacial polymerization is used to prepare the capsules used in the invention. This technique is well-known and has been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerization is a particularly preferred technology for the preparation of capsules comprising the precursor for a Si—O-containing moiety according to structural formula I. In interfacial polymerization, such as interfacial polycondensation, two reactants meet at the interface of the emulsion droplets and react rapidly.

In general, interfacial polymerization requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerization, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerization. The capsules according to the present invention are preferably prepared from an oleophilic dispersion in an aqueous continuous phase wherein the precursor for a Si—O-containing moiety according to structural formula I is dissolved or dispersed in the oleophilic phase.

Typical polymeric shells of the capsules according to the invention and formed by interfacial polymerization are selected from the group consisting of polyamides, typically prepared from di- or oligoamines as first shell component and di- or poly-acid chlorides as second shell component, polyurea, typically prepared from di- or oligoamines as first shell component and di- or oligoisocyanates as second shell component, polyurethanes, typically prepared from di- or oligoalcohols as first shell component and di- or oligoisocyanates as second shell component, polysulfonamides, typically prepared from di- or oligoamines as first shell component and di- or oligosulfochlorides as second shell component, polyesters, typically prepared from di- or oligoalcohols as first shell component and di- or oligo-acid chlorides as second shell component and polycarbonates, typically prepared from di- or oligoalcohols as first shell component and di- or oligo-chloroformates as second shell component. The shell can be composed of combinations of these polymers.

In a further embodiment, polymers, such as gelatine, chitosan, albumin and polyethylene imine can be used as first shell components in combination with a di- or oligo-isocyanate, a di- or oligo acid chloride, a di- or oligo-chloroformate and an epoxy resin as second shell component.

In a particularly preferred embodiment, the shell is composed of a polyurethane, a polyurea or a combination thereof. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters, ketones and DCM are particularly preferred as water immiscible solvent.

In order to link the Si—O-containing moiety to the polymeric shell of a capsule, compounds containing the Si—O-containing moiety having a reactive group are incorporated in the core of the capsule. Preferably this is achieved by dissolving or dispersing a precursor for linking the Si—O-containing moiety to the polymeric shell in the oleophilic phase. Preferred precursors are listed in Table 1.

In the most preferred embodiment, the capsules comprising the Si containing moiety are self-dispersing capsules. In order to make capsules self-dispersing, non-ionic groups such as polyether chains, anionic dispersing groups, such as carboxylic acids or salts thereof, or cationic dispersing groups such as ammonium groups have to be coupled covalently to the polymeric shell of the capsule to guarantee the dispersion stability. A mixture of a non-ionic group with an anionic or cationic group is also possible.

A preferred strategy to incorporate anionic stabilizing groups into the polymeric shell of the encapsulated resin comprising a repeating unit according to general formula A, makes use of carboxylic acid functionalized reactive surfactants that are capable of reacting with isocyanates. This leads to an amphoteric type of surfactant containing at least partially secondary or primary amines. Other reactive surfactants functionalized with a sulfonic acid or salt thereof, a phosphoric acid ester or a salt thereof or a phosphonic acid or salt thereof can be used.

Another preferred strategy is to incorporate an anionic stabilizing group together with a non-ionic stabilising group into the shell polymer. The non-ionic stabilising group may be a polyether structure, preferably a group as disclosed in [0019-0020] of EP3564318A1. Such a non-ionic group can be incorporated by using isocyanates comprising a polyether group in the encapsulation process. Suitable isocyanates are: Bayhydur 3100, Bayhydur 304, Bayhydur 305, Bayhydur XP2451/1, Bayhydur 401-70, supplied by Covestro AG. When the shell has both an anionic and a non-ionic dispersing group, the dispersing effect of both groups synergistically provide marked improvement dispersion stability.

Another preferred strategy to incorporate cationic stabilizing groups into the polymeric shell of the encapsulated resin comprising the Si containing moiety, makes use of coupling a surfactant with a cationic dispersing group to the polymeric shell according to the present invention by reaction of a surfactant comprising at least one primary or secondary amine group and at least a group selected from protonated amine, a protonated nitrogen containing heteroaromatic compound, a quaternized tertiary amine, a N-quaternized heteroaromatic compound, a sulfonium and a phosphonium with an isocyanate monomer of the shell. In an even more preferred embodiment said surfactant is a surfactant according to General Formula III

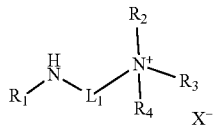

General Formula III wherein
- $R_1$ is selected from the group consisting of a substituted or unsubstituted alkyl group, a substituted or unsubstituted alkenyl group and a substituted or unsubstituted alkynyl group with the proviso that $R_1$ comprises at least eight carbon atoms;
- $R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group
- $L_1$ represents a divalent linking group comprising no more than eight carbon atoms;
- X represents a counterion to compensate the positive charge of the ammonium group.

The capsules have an average particle size preferably of no more than 4 μm as determined by dynamic laser diffraction. The nozzle diameter of inkjet print heads is usually 20 to 35 μm. Reliable inkjet printing is possible if the average particle size of the capsules is five times smaller than the nozzle diameter. An average particle size of no more than 4 μm allows jetting of inks incorporating the dispersion of the invention by print heads having the smallest nozzle diameter of 20 μm. In a more preferred embodiment, the average particle size of the capsules is ten times smaller than the nozzle diameter. Hence preferably, the average particle size is from 0.05 to 2 μm, more preferably from 0.10 to 1 μm. When the average particle size of the capsule is smaller than 2 μm, excellent resolution and dispersion stability with time are obtained.

The capsules according to the invention are dispersed into an aqueous medium. The aqueous medium consists of water, but may preferably include one or more water-soluble organic solvents. It has been observed that the presence of water-soluble organic solvent in the inkjet ink or pre-treatment liquid further enhances the solvent and water resistance of the obtained coatings and images.

Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl-2-pyrrolidone), and acetonitrile.

B. Aqueous Formulations Comprising the Dispersion of the Invention

B.1. Pre-Treatment Liquid

Aqueous pre-treatment liquids are preferably used in inkjet printing with aqueous based inks onto low-absorbing or non-absorbing substrates. The aqueous pre-treatment liquid according to the invention comprises the dispersion of particles, the particles comprises a polymer and the Si—O—containing moiety according to the structural Formula I is linked to the polymer. More preferably, the Si—O-containing moiety is linked to the polymeric shell of a capsule.

The polymeric shell further comprises a dispersing group, preferably covalently bonded to the shell, more preferably, the dispersing group is a group selected from the group of a protonated amine, a protonated nitrogen containing heteroaromatic compound, a quaternized tertiary amine, a N-quaternized heteroaromatic compound, a sulfonium and a phosphonium. The cationic dispersing groups will help in flocculating or crashing the anionic stabilized colorants in the aqueous inkjet ink leading to a reduced bleeding and beading in the formed image. The capsules are preferably in an amount of no more than 45 wt. %, more preferably between 5 and 25 wt. % based on the total weight of the pre-treatment liquid.

A multivalent metal ion can be contained in the pre-treatment liquid as a flocculant. Suitable examples are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating ink by acting on the carboxyl groups on the surface of the pigment in the ink jet ink, or on the dispersed polymer of capsules contained in the ink. As a result, the colorants of the ink are fixed resulting in a decreased bleeding and beading. Therefore, it is preferred that the surface of the pigment in the ink and/or the dispersed polymer of the capsules, if contained in the ink, have an anionic group, preferably a carboxyl group.

The pre-treatment may also contain organic acids as a flocculant. Preferred examples of the organic acids include, but are not limited to, acetic acid, propionic acid, and lactic acid.

The pre-treatment liquid may also contain humectants. Humectants are preferably incorporated in the pre-treatment liquid if this liquid has to be applied by means of a jetting technique such as inkjet or valve jet. Humectants prevent the clogging of nozzles. The prevention is due to its ability to slow down the evaporation rate of the pre-treatment liquid, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the liquid formulation in an amount of 0.1 to 20 wt. % based on the total weight of the liquid.

The pre-treatment liquid may contain a surfactant. Any known surfactant may be used but preferably a glycol surfactant and/or an acetylene alcohol surfactant and/or polysiloxane surfactant. The use of the acetylene glycol surfactant and/or the acetylene alcohol surfactant and/or polysiloxane surfactant further reduces bleeding to improve printing quality, and also improves the drying property in printing to allow high-speed printing.

The acetylene glycol surfactant and/or the acetylene alcohol surfactant is preferably one or more selected from 2, 4, 7, 9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1010, or from Nissin Chemical Industry as Surfynol (registered trademark) 465 and Surfynol 61.

The pre-treatment liquid may also contain pigments. Particularly useful for printing on dark or transparent substrates, is a pre-treatment liquid containing a white pigment. The preferred pigment for the aqueous pre-treatment liquid ink is titanium dioxide. Titanium dioxide ($TiO_2$) pigment useful in the present invention may be in the rutile or anastase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the pre-treatment liquid. For applications demanding high hiding or decorative printing applications, the titanium dioxide particles preferably have an average size of less than about I μm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TIO_2$.

The titanium dioxide is preferably incorporated into the pre-treatment formulation via a slurry concentrate composition. The amount of titanium dioxide present in the slurry composition is preferably from about 15 wt. % to about 80 wt. %, based on the total slurry weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with the cationic stabilised capsules of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

The pre-treatment liquid may contain at least one pH adjuster. Suitable pH adjusters include organic amines, NaOH, KOH, $NEt_3$, $NH_3$, HCl, $HNO_3$ and $H_2SO_4$. In a preferred embodiment, the pre-treatment liquid has a pH lower than 7. A pH of 7 or less can advantageously influence the electrostatic stabilization of the capsules, especially when the dispersing groups of the capsules are amines.

B.2. Aqueous Inkjet Ink.

The aqueous inkjet ink according to the present invention includes at least a) an aqueous medium; and b) a dispersion of particles, the particles comprise a polymer and a Si—O-containing moiety, the Si—O-containing moiety is according to the structural Formula I and is linked to the polymer. Preferably the Si—O-containing moiety is linked to the polymeric shell of a capsule. The polymeric shell may further comprise a dispersing group, preferably covalently bonded to the shell, more preferably, the dispersing group is a group selected from the group consisting of a carboxylic acid or salt thereof, a sulfonic acid or salt thereof, a phosphoric acid ester or salt thereof, a phosphonic acid or salt thereof. A combination of both an anionic and a non-ionic dispersing group linked to the polymeric shell can also be used to stabilise the capsule in an inkjet ink.

The resin particles according to the invention are preferably present in the inkjet ink in an amount of no more than 30 wt. %, preferably between 5 and 25 wt. % based on the total weight of the inkjet ink. It was observed that above 30 wt. % jetting was not always so reliable.

In a preferred embodiment, the inkjet ink according to the invention is part of an inkjet ink set, more preferably part of a multi-colour inkjet ink set including a plurality of inkjet inks according to the invention. The inkjet ink set preferably includes at least a cyan inkjet ink, a magenta inkjet ink, a yellow inkjet ink and a black inkjet ink. Such a CMYK-inkjet ink set may also be extended with extra inks such as red, green, blue, violet and/or orange to further enlarge the colour gamut of the image. The inkjet ink set may also be extended by the combination of the full density inkjet inks with light density inkjet inks. The combination of dark and light colour inks and/or black and grey inks improves the image quality by a lowered graininess.

In a preferred embodiment, the inkjet ink set also includes a white inkjet ink. This allows obtaining more brilliant colours, especially on transparent substrates, where the white inkjet ink can be applied either as a primer or on top of the colour inkjet inks when the image is viewed through the transparent substrate.

The viscosity of the inkjet ink is preferably smaller than 25 mPa·s at 25° C. and at a shear rate of 90 $s^{-1}$, more preferably between 2 and 15 mPa·s at 25° C. and at a shear rate of 90 $s^{-1}$.

The surface tension of the inkjet ink is preferably in the range of about 18 mN/m to about 70 mN/m at 25° C., more preferably in the range of about 20 mN/m to about 40 mN/m at 25° C.

The inkjet ink may also contain at least one surfactant for obtaining good spreading characteristics on a substrate.

B.2.1. Solvent

The aqueous medium of the ink contains water, but may preferably include one or more water-soluble organic solvents. Suitable solvents which can be incorporated in the inks are described in § A.3.2.

B.2.2. Pigments

The pigments of the aqueous inkjet ink may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548.

The pigment particles are dispersed in an aqueous medium by means of a polymeric dispersant or a surfactant. Self-dispersible pigments may also be used. If combined with capsules having anionic dispersing groups, anionic surfactants may be preferably used as dispersant for the pigment. A self-dispersible pigment is a pigment having on its surface covalently bonded anionic hydrophilic groups, such as salt-forming groups or the same groups used as dispersing groups for the capsules comprising the resin comprising a repeating unit according to general formula I, that allow the pigment to be dispersed in an aqueous medium without using a surfactant or a resin. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. The average particle size of pigment particles is determined with a Brookhaven Instruments Particle Sizer BI90plus based upon the principle of dynamic light scattering. The ink is diluted with water to a pigment concentration of 0.002 wt. %. The measurement settings of the BI90plus are: 5 runs at 23° C., angle of 90°, wavelength of 635 nm and graphics=correction function.

However, for white pigment inkjet inks, the numeric average particle diameter of the white pigment is the same as described in § B.1.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOL-SPERSE™ dispersants available from Lubrisol. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

B.2.3. Resin

The ink jet ink composition according to the invention may further comprise an additional resin. The resin is often added to the ink jet ink formulation to further achieve a good adhesion of the pigment to the substrate. The resin is a polymer and suitable resins can be acrylic based resins, a urethane-modified polyester resin or a wax.

The concentration of the resin in the ink jet ink according to the invention is at least 1 (wt.)% and preferably lower than 30 (wt.)%, more preferably lower than 20 (wt.)%.

B.2.4. Additives

The aqueous inkjet ink according to the invention may further comprise a surfactant, a humectant and a thickener as an additive. These suitable additives are described in § B.1.

C. Inkjet Printing Method

In a preferred inkjet recording method, the method comprises the steps of: a) jetting an aqueous inkjet ink on a substrate, preferably a non-porous substrate, the ink comprising the dispersion of particles comprising a polymer and a Si—O-containing moiety, the Si—O-containing moiety is according to the structural Formula I and is linked to the polymer; and b) drying the jetted inkjet ink by applying heat such as to obtain a temperature of the jetted ink of at least 80° C., more preferably at least 100° C. Before the jetting of the inkjet ink according to the invention, an aqueous pre-treatment liquid or primer can be applied onto the substrate. The aqueous pre-treatment liquid comprises preferably a flocculant selected from the group consisting of a multivalent salt and a cationic resin.

In another preferred inkjet recording method, the method comprises the steps of: a) applying an aqueous pre-treatment liquid on a substrate, preferably a non-porous substrate, the pre-treatment liquid comprising the dispersion of particles comprising a polymer and a Si—O-containing moiety, the Si—O-containing moiety is according to the structural Formula I and is linked to the polymer; b) optionally at least partially dry the applied aqueous pre-treatment liquid such as to obtain a temperature of the applied pre-treatment liquid of at least 80° C., more preferably at least 100° C.; and c) jetting an aqueous inkjet ink onto the applied pre-treatment liquid, the ink comprising a colorant preferably a pigment and more preferably also comprising the dispersion of resin particles, the resin comprising a repeating unit according to the general formula I; and d) drying the jetted inkjet. If step b) was not performed, or the drying of the pre-treatment liquid was not completed, the drying in step d) should be performed by applying heat such that the temperature of the jetted ink is of at least 80° C., more preferably at least 100° C.

The substrate in the inkjet recording method may be porous, such as e.g. textile, paper, leather and card board substrates, but is preferably a non-absorbing substrate such as polyethylene, polypropylene, polycarbonate, polyvinyl chloride, polyesters like polyethylene terephthalate (PET), polyethylene naphthalate (PEN), polylactide (PLA), polymethylmethacrylate or polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

In another preferred inkjet recording method, the pre-treatment liquid is applied via a technique selected from the group of ink jetting, valve jetting and spraying. More specifically, these techniques of ink jetting and valve jetting allow, the pre-treatment liquid according to the invention to be applied image wise, preferably onto the surfaces whereupon the inkjet ink will be printed to obtain an image. These last means of applying the pre-treatment liquid has the advantage that the amount of required pre-treatment liquid is substantially lower than with other application methods of priming the substrate.

Examples of the heating process to dry the pre-treatment liquid or the inkjet ink according to the invention include, but are not limited to, heat press, atmospheric steaming, high-pressure steaming, THERMOFIX. Any heat source can be used for the heating process; for example, an infrared ray source is employed.

The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. The drying step is such that a temperature is preferably obtained below 150° C.

A preferred ink jet head for the inkjet printing system to jet the inkjet ink or pre-treatment liquid comprising the resin particles according to the invention is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink or liquid. When the voltage is again removed, the ceramic expands to its original shape, ejecting a drop of ink from the ink jet head. However, the jetting of the aqueous inkjet ink or aqueous pre-treatment liquid comprising the particle dispersion according to the present invention is not restricted to piezoelectric inkjet printing. Other inkjet print heads can be used and include various types, such as a continuous type, a thermal print head type, a MEM-jet type head and a valve jet type.

D. Examples

D.1. Materials

All materials used in the following examples were readily available from standard sources such as Merck and ACROS (Belgium) unless otherwise specified. The water used was deionized water.

Lakeland ACP70 is a 70-75 wt. % solution of CASRN84812-94-2 in ethane-1,2-diol supplied by Espachem.

Desmodur Z4470 is a 70 wt % solution in butyl acetate of an IPDI trimer (isocyanurate), available from Covestro Trixene BI7963 is a 70% solution of trixene blocked HDI biureth in 1-methoxy-2-propanol, supplied by Baxenden Chemicals Takenate D120N is a trimethylol propane adduct of hydrogenated xylylene diisocyanate (H6XDI), manufactured by Mitsui Chemicals.

Takenate D131N is an XDI isocyanurate, manufactured by Mitsui Chemicals.

Takenate D140N is a 75 wt % solution in ethyl acetate of an IPDI trimer (TMP adduct), available from MITSUI CHEMICALS Sub-1 is poly(propylene) (Priplak), supplied by Antalis Sub-2 is a PMMA substrate (Antalis014), supplied by Antalis Dowanol DPM is a mixture of dipropyleneglycol monomethyl ethers supplied by Dow Chemical Diamond D75M is a 15 wt. % dispersion of pigment red 122 in water, available from Diamond Dispersion.

RAS-1, is a precursor for linking a Si—O-moiety to the polymer according to structural Formula I and is prepared as follows: 8.015 g of Takenate D120N is added to 20 mL of ethyl acetate while stirring, resulting in a clear solution. A solution of 1.731 g of (3-aminopropyl) triethoxysilane in 3.3 mL of ethyl acetate is then added dropwise. The reaction is exothermic and the mixture is used as such.

R-COMP, is as follows: 8.015 g of Takenate D120N is added to 20 mL of dichloromethane while stirring, resulting in a clear solution. A solution of 1.069 g of 1-aminooctane in 5 mL of dichloromethane is then added dropwise. The reaction is exothermic and the mixture is used as such.

D.2. Example 1

Preparation of Inventive Particle Dispersion INVDISP-1

In a first pot, 7 g of RAS-1 was added to 23 g of ethyl acetate. 20 g of Takenate D131N was then added under stirring, resulting in a clear solution. 1.32 g of Lakeland ACP70 was added to this mixture. In a separate pot, 3.86 g of Lakeland ACP70, 0.236 g of a 28 wt. % ammonia solution and 2 g of L-lysine were added to 70 g of water and stirred until everything was dissolved. The first pot was then added to the second pot while stirring during 5 min, using a T25 digital Ultra-Turrax® with an 18N rotor commercially available from IKA at 15000 rpm. A white emulsion was thus obtained. The organic solvent and ammonia were then removed under reduced pressure at 40° C., as well as 44.6 g of water. The same amount of water was then added again to the dispersion after which it was left to react further at 21° C. during 16 hours.

Preparation of Comparative Particle Dispersion COMPDISP-1

In a first pot, 9.459 g of Takenate D120N was added to 20 g of ethyl acetate. 20 g of Takenate D131N was then added under stirring, resulting in a clear solution. 1.32 g of Lakeland ACP70 was added to this mixture. In a separate pot, 3.86 g of Lakeland ACP70, 0.236 g of a 28% ammonia solution and 2 g of L-lysine were added to 70 g of water and stirred until everything was dissolved. The first pot was then added to the second pot while stirring during 5 min, using a T25 digital Ultra-Turrax® with an 18N rotor commercially available from IKA at 15000 rpm. A white emulsion was thus obtained. The organic solvent and ammonia were then removed under reduced pressure at 40° C., as well as 18.03 g of water. The same amount of water was then added again to the dispersion after which it was left to react further at 21° C. during 16 hours.

Preparation of Comparative Particle Dispersion COMPDISP-2

In a first pot, 7 g of R-COMP was added to 20 g of dichloromethane. 20 g of Takenate D131N was then added under stirring, resulting in a clear solution. 1.32 g of Lakeland ACP70 was added to this mixture. In a separate pot, 3.86 g of Lakeland ACP70, 0.236 g of a 28 wt. % ammonia solution and 2 g of L-lysine were added to 70 g of water and stirred until everything was dissolved. The first pot was then added to the second pot while stirring during 5 min, using a T25 digital Ultra-Turrax® with an 18N rotor commercially available from IKA at 15000 rpm. A white emulsion was thus obtained. The organic solvent and ammonia were then removed under reduced pressure at 40° C., as well as 19.5 g of water. The same amount of water was then added again to the dispersion after which it was left to react further at 21° C. during 16 hours Preparation of Comparative Particle Dispersion COMPDISP-3

In a first pot, 10 g of Trixene 817963 was added to 20 g of dichloromethane. 20 g of Takenate D131N was then added under stirring, resulting in a clear solution. 1.32 g of Lakeland ACP70 was added to this mixture. In a separate pot, 3.86 g of Lakeland ACP70, 0.236 g of a 28 wt. % ammonia solution and 2 g of L-lysine were added to 70 g of water and stirred until everything was dissolved. The first pot was then added to the second pot while stirring during 5 min, using a T25 digital Ultra-Turrax® with an 18N rotor commercially available from IKA at 15000 rpm. A white emulsion was thus obtained. The organic solvent and ammonia were then removed under reduced pressure, as well as 14.8 g of water. The same amount of water was then added again to the dispersion after which it was left to react further at 21° C. during 16 hours.

Preparation of Aqueous Inks Comprising Inventive and Comparative Dispersions.

Inventive and comparative aqueous inkjet inks were prepared by mixing the ingredients as listed in Table 2.

TABLE 2

| Amount in g added | INV INK-1 | COMP INK-1 | COMP INK-2 | COMP INK-3 |
|---|---|---|---|---|
| INVDISP-1 | 4.096 | | | |
| COMPDISP-1 | — | 4.096 | | |
| COMPDISP-2 | — | | 4.096 | |
| COMPDISP-3 | | | | 4.096 |
| Diamond D75M | 2.309 | 2.309 | 2.309 | 2.309 |
| 1:1 mixture Dowanol DPM/Glycol | 4.0 | 4.0 | 4.0 | 4.0 |

Evaluation of the Physical Properties of the Coated Aqueous Inventive and Comparative Inks.

The aqueous inks were coated on Sub-1 and Sub-2 using an Elcometer Bird Film Applicator (from Elcometer instruments) with a wet thickness of 4 μm and dried for 5 minutes at 100° C. in an oven.

The coatings were evaluated towards their water and ethanol resistance by rubbing with a Q-tip 5 10 times. The quality of the coating after the rub-test is rated with a number from 1 to 4. (1=good, 2=medium, 3=poor, 4=very poor). The results are summarized in Table 3 for the coatings obtained on Sub-1 and in Table 4 for the coatings obtained on Sub-2.

TABLE 3

| Sub-1 | INV INK-1 | COMP INK-1 | COMP INK-2 | COMP INK-3 |
|---|---|---|---|---|
| 10× water | 2 | 2 | 2 | 4 |
| 10× Ethanol | 2 | 3 | 2 | 1 |

TABLE 4

| Sub-2 | INV INK-1 | COMP INK-1 | COMP INK-2 | COMP INK-3 |
|---|---|---|---|---|
| 10× water | 3 | 4 | 4 | 4 |
| 10× Ethanol | 1 | 1 | 1 | 4 |

From Table 3 and Table 4, it is clear that the aqueous ink comprising the particle dispersion according to the invention shows an improved adhesion on a non-absorbing substrate such as polypropylene and PMMA with respect to inks having particle dispersions different from the one of the invention.

D.3. Example 2

This example shows that the presence of a Si—O-containing moiety according to the structural Formula I, linked to the polymer by adding a Si—O-containing moiety precursor to the organic solvent during the preparation of the particle dispersion, is improving the shelf-life stability of inkjet inks drastically. The experiments also indicate that inks containing capsules (or beads) consisting purely of the Si—O-containing moiety according to the structural Formula I, have a very good shelf-life stability. In absence of the Si—O-containing moiety precursor (i.e. pure Desmodur Z4470 is used to make a capsule, or again "bead",) the ink has a very limited stability.

Preparation of the Inventive Particle Dispersions INVDISP-2 to INVDISP-5 INVDISP-2

In a first pot, 14 g of Desmodur Z4470 was added to 20 g of ethyl acetate. A solution of 3.5 g of 3-aminopropyltri-ethoxysilane in 1.5 g of ethyl acetate was then added dropwise and after reaction, a colourless solution was obtained. The mixture was stirred further at room temperature and 4.67 g of Desmodur Z4470 was then added, resulting in a clear solution. Si—O-containing moiety precursor RAS-3 was thus obtained. 1.32 g of Lakeland ACP70 was added to this mixture. In a separate pot, 3.86 g of Lakeland ACP70, 0.236 g of a 28% ammonia solution and 2 g of L-lysine were added to 70 g of water and stirred at 80° C. until everything was dissolved. The first pot was then added to the second pot while stirring during 5 min, using a T25 digital Ultra-Turrax® with an 18N rotor commercially available from IKA at 15000 rpm. A white emulsion was thus obtained. The organic solvent and ammonia were then removed under reduced pressure at 40° C., as well as 19.5 g of water. The same amount of water was then added again to the dispersion after which it was left to react further at 40° C. during 16 hours.

INVDISP-3

In a first pot, 10.5 g of Desmodur Z4470 was added to 20 g of ethyl acetate. A solution of 2.62 g of 3-aminopropyl-triethoxysilane in 1.5 g of ethyl acetate was then added dropwise and after reaction, a colourless solution was obtained. The mixture was stirred further at room temperature and 14 g of Desmodur Z4470 was then added, resulting in a clear solution. Si—O-containing moiety precursor RAS-3 was thus obtained 0.1.32 g of Lakeland ACP70 was added to this mixture. In a separate pot, 3.86 g of Lakeland ACP70, 0.236 g of a 28% ammonia solution and 2 g of L-lysine were added to 70 g of water and stirred at 80° C. until everything was dissolved. The first pot was then added to the second pot while stirring during 5 min, using a T25 digital Ultra-Turrax® at 15000 rpm. A white emulsion was thus obtained. The organic solvent and ammonia were then removed under reduced pressure at 40° C., as well as 24 g of water. The same amount of water was then added again to the dispersion after which it was left to react further at 21° C. during 16 hours.

INVDISP-4

In a first pot, 7 g of Desmodur Z4470 was added to 23 g of ethyl acetate. A solution of 1.75 g of 3-aminopropyltri-ethoxysilane in 1.5 g of ethyl acetate was then added dropwise and after reaction, a colourless solution was obtained. The mixture was stirred further at room temperature and 20 g of Desmodur Z4470 was then added, resulting in a clear solution. Si—O-containing moiety precursor RAS-3 was thus obtained. 1.32 g of Lakeland ACP70 was added to this mixture. In a separate pot, 3.86 g of Lakeland ACP70, 0.236 g of a 28% ammonia solution and 2 g of L-lysine were added to 70 g of water and stirred at 80° C. until everything was dissolved. The first pot was then added to the second pot while stirring during 5 min, using a T25 digital Ultra-Turrax® at 15000 rpm. A white emulsion was thus obtained. The organic solvent and ammonia were then removed under reduced pressure at 40° C., as well as 19.5 g of water. The same amount of water was then added again to the dispersion after which it was left to react further at 40° C. during 16 hours.

INVDISP-5

In a first pot, 15.7 g of Takenate D140N was added to 20 g of ethyl acetate. A solution of 3.3 g of 3-aminopropyltri-ethoxysilane in 1.7 g of ethyl acetate was then added dropwise and after reaction, a colourless solution was obtained. The mixture was stirred further at room temperature and 9.3 g of Takenate D140N was then added, resulting in a clear solution. Si—O-containing moiety precursor RAS-4 was thus obtained. 1.32 g of Lakeland ACP70 was added to this mixture. In a separate pot, 3.86 g of Lakeland ACP70, 0.236 g of a 28% ammonia solution and 2 g of L-lysine were added to 70 g of water and stirred at 80° C. until everything was dissolved. The first pot was then added to the second pot while stirring during 5 min, using a T25 digital Ultra-Turrax® at 15000 rpm. A white emulsion was thus obtained. The organic solvent and ammonia were then removed under reduced pressure at 40° C., as well as 17 g of water. The same amount of water was then added again to the dispersion after which it was left to react further at 40° C. during 16 hours.

INVDISP-6

In a first pot, 14 g of Desmodur Z4470 was added to 20 g of ethyl acetate. A solution of 3.5 g of 3-aminopropyltri-ethoxysilane in 1.5 g of ethylacetate was then added dropwise and after reaction, a colourless solution was obtained. 1.32 g of Lakeland ACP70 was added to this mixture. In a separate pot, 3.86 g of Lakeland ACP70, 0.236 g of a 28% ammonia solution and 2 g of L-lysine were added to 70 g of water and stirred at 80° C. until everything was dissolved. The first pot was then added to the second pot while stirring during 5 min, using a T25 digital Ultra-Turrax® at 15000 rpm. A white emulsion was thus obtained. The organic solvent and ammonia were then removed under reduced pressure at 40° C., as well as 19.5 g of water. The same amount of water was then added again to the dispersion after which it was left to react further at 40° C. during 16 hours.

Preparation of the Comparative Particle Dispersions

COMPDISP-4

In a first pot, 29.33 g of Desmodur Z4470 was added to 30 g of ethyl acetate, resulting in a clear solution. 1.32 g of Lakeland ACP70 was added to this mixture. In a separate pot, 3.86 g of Lakeland ACP70, 0.236 g of a 28% ammonia solution and 2 g of L-lysine were added to 70 g of water and stirred at 80° C. until everything was dissolved. The first pot was then added to the second pot while stirring during 5 min, using a T25 digital Ultra-Turrax® from IKA at 15000 rpm. A white emulsion was thus obtained. The organic solvent and ammonia were then removed under reduced pressure at 40° C., as well as 19.5 g of water. The same amount of water was then added again to the dispersion after which it was left to react further at 40° C. during 16 hours.

COMPDISP-5

In a first pot, 29.33 g of Takenate D140N was added to 40 g of ethyl acetate and 10 g dichloromethane, resulting in a clear solution. 1.32 g of Lakeland ACP70 was added to this mixture. In a separate pot, 3.86 g of Lakeland ACP70, 0.236 g of a 28% ammonia solution and 2 g of L-lysine were added to 70 g of water and stirred at 80° C. until everything was dissolved. The first pot was then added to the second pot while stirring during 5 min, using a T25 digital Ultra-Turrax® at 15000 rpm. A white emulsion was thus obtained. The organic solvent and ammonia were then removed under reduced pressure at 40° C., as well as 23.3 g of water. The same amount of water was then added again to the dispersion after which it was left to react further at 40° C. during 16 hours.

COMPDISP-6

In a first pot, 18.68 g of Desmodur Z4470 was added to 22 g of ethyl acetate. The mixture was stirred further at room temperature and 14 g of Desmodur Z4470 was then added, resulting in a clear solution. 1.32 g of Lakeland ACP70 was then added to this mixture. In a separate pot, 3.86 g of Lakeland ACP70, 0.236 g of a 28% ammonia solution and 2 g of L-lysine were added to 70 g of water and stirred at 80° C. until everything was dissolved. The first pot was then added to the second pot while stirring during 5 min, using a T25 digital Ultra-Turrax® with an 18N rotor commercially available from IKA at 15000 rpm. A white emulsion was thus obtained, after which 3.5 g of 3-aminopropyltriethoxysilane was added drop-wise. The organic solvent and ammonia were then removed under reduced pressure at 40° C., as well as 24 g of water. The same amount of water was then added again to the dispersion after which it was left to react further at 21° C. during 16 hours.

Preparation of the Aqueous Inkjet Inks

Inventive and comparative aqueous inkjet inks were prepared by mixing the ingredients as listed in Table 5.

TABLE 5

|  | INVINK-2 | INVINK-3 | INVINK-4 | INVINK-5 | INVINK-6 | COMP INK-4 | COMP INK-5 | COMP INK-6 |
|---|---|---|---|---|---|---|---|---|
| INVDISP-2 | 4.096 | | | | | | | |
| INVDISP-3 | | 4.096 | | | | | | |
| INVDISP-4 | | | 4.096 | | | | | |
| INVDISP-5 | | | | 4.096 | | | | |
| INVDISP-6 | | | | | 4.096 | | | |
| COMP DISP-4 | | | | | | 4.096 | | |
| COMP DISP-5 | | | | | | | 4.096 | |
| COMP DISP-6 | | | | | | | | 4.096 |
| Diamond D75M | 2.309 | 2.309 | 2.309 | 2.309 | 2.309 | 2.309 | 2.309 | 2.309 |
| 1:1 mixture Dowanol/ Glycol | 4.0 | 4.0 | 4.0 | 4.0 | 4.0 | 4.0 | 4.0 | 4.0 |

Evaluation of the Storage Stability of the Aqueous Inventive and Comparative Inks The aqueous inkjet inks were scored on storage stability by putting them in an oven at 60° C. and evaluating them microscopically after 12 hours, 24 hours, and then daily up till 14 days. If no microscopic change and no viscosity change was observed, the inks were regarded stable. Flocculation and drastic viscosity changes were evaluated as being unstable. The number of days the inks are evaluated as stable are listed in Table 6.

Evaluation of the Water Resistance and Chemical Resistance of the Coating of Comparative and Inventive Inks The aqueous inkjet inks were coated on Sub-1 and Sub-2 as described in Example 1. The obtained coatings were evaluated the same way as described in Example 1.

The results of the water resistance and chemical resistance are summarized in Table 6

TABLE 6

| | storage stability | Sub-1 EtOH | Sub-1 water | Sub-2 EtOH | Sub-2 water |
|---|---|---|---|---|---|
| INVINK-2 | 14 d | 1 | 1 | 1 | 1 |
| INVINK-3 | 14 d | 1 | 1 | 1 | 1 |

TABLE 6-continued

| | storage stability | Sub-1 EtOH | Sub-1 water | Sub-2 EtOH | Sub-2 water |
|---|---|---|---|---|---|
| INVINK-4 | 14 d | 1 | 1 | 1 | 1 |
| INVINK-5 | 14 d | 1 | 1 | 1 | 1 |
| INVINK-6 | 7 d | 1 | 1 | 1 | 1 |
| COMPINK-4 | 12 hours | 1 | 1 | 1 | 1 |
| COMPINK-5 | 2 d | 1 | 1 | 1 | 4 |
| COMPINK-6 | 2 d | 1 | 1 | 1 | 1 |

All inks, both inventive and comparative, provide coatings on Sub-1 and Sub-2 showing a good water and solvent resistance. However, only the inventive inks comprising the particle dispersion according to the invention show an excellent storage stability at 60° C. of at least 14 days.

The invention claimed is:

1. An aqueous particle dispersion comprising a polymer and a Si—O-containing moiety, wherein the Si—O-containing moiety comprises a structure of Formula II and is linked to the polymer,

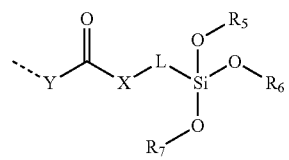

Formula II wherein $R_5$, $R_6$, and $R_7$ each independently represent a substituted or unsubstituted alkyl, aryl, aralkyl, or heteroalkyl group;

L represents a divalent or multivalent linking group comprising no more than eight carbon atoms;

X is NH, NR, or O;

Y is NH, NR, O, or a carbonyl moiety; and

R is a substituted or unsubstituted alkyl, aryl, aralkyl, or heteroalkyl group, and wherein the particle dispersion is obtainable by adding a Si—O-containing moiety precursor to an organic solvent during the preparation of the particle dispersion.

2. The aqueous particle dispersion of claim 1, wherein the particle is a capsule consisting of a core and a shell, wherein the shell comprises the polymer.

3. The aqueous particle dispersion of claim 1, wherein the polymer is selected from the group consisting of polyureas, polyurethanes, polyurea-urethanes, polyesters, polycarbonates, polyamides, melamine-based polymers, and mixtures thereof.

4. The aqueous particle dispersion of claim 1, wherein the Si—O-containing moiety precursor is of Formula IV or Formula V:

Formula IV

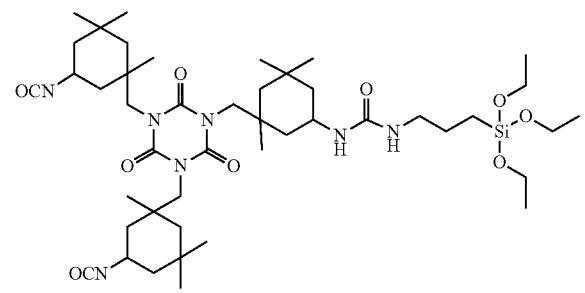

Formula V

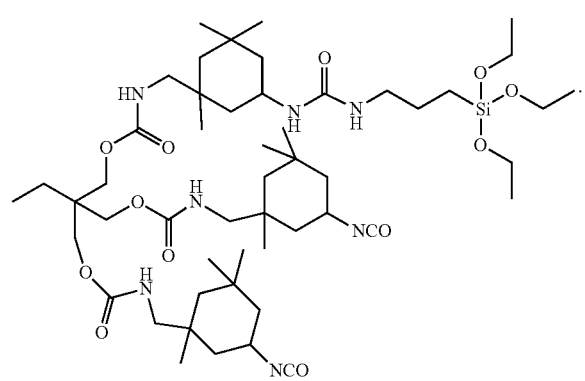

5. The aqueous particle dispersion of claim 2, wherein the Si—O-containing moiety precursor is of Formula IV or Formula V:

Formula IV

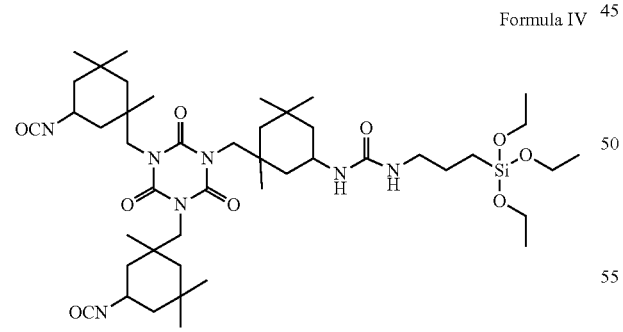

Formula V

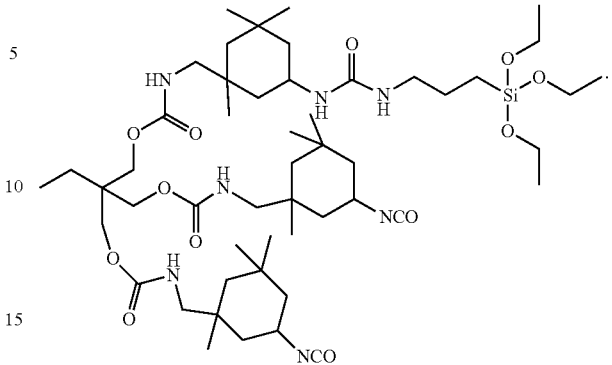

6. The aqueous particle dispersion of claim 2, wherein a dispersing group is covalently bonded to the polymer.

7. The aqueous particle dispersion of claim 3, wherein a dispersing group is covalently bonded to the polymer.

8. The aqueous particle dispersion of claim 6, wherein the dispersing group is selected from the group consisting of a carboxylic acid or salt thereof, a sulfonic acid or salt thereof, a phosphoric acid ester or a salt thereof, and a phosphonic acid or salt thereof.

9. The aqueous particle dispersion of claim 7, wherein the dispersing group is selected from the group consisting of a carboxylic acid or salt thereof, a sulfonic acid or salt thereof, a phosphoric acid ester or a salt thereof, and a phosphonic acid or salt thereof.

10. The aqueous particle dispersion of claim 6, wherein the dispersing group is selected from the group consisting of a protonated amine, a protonated nitrogen containing heteroaromatic group, a quaternized tertiary amine, a N-quaternized heteroaromatic group, a sulfonium, and a phosphonium.

11. An aqueous inkjet ink comprising a pigment and the aqueous particle dispersion of claim 1.

12. An aqueous inkjet ink comprising a pigment and the aqueous particle dispersion of claim 3.

13. An aqueous treatment liquid for inkjet printing comprising the aqueous particle dispersion of claim 10 and a flocculating agent selected from the group consisting of a cationic polymer, a multivalent metal ion, and an organic acid.

14. An inkjet recording method comprising the steps of:
   a) jetting an inkjet ink as defined in claim 11 on a substrate; and
   b) drying the jetted inkjet ink by applying heat to obtain a temperature of the jetted ink of at least 80° C.

15. The inkjet recording method of claim 14, wherein, prior to step a), an aqueous treatment liquid comprising a flocculating agent selected from the group consisting of a multivalent salt and a cationic polymer, is applied on the substrate.

* * * * *